(12) United States Patent
Lee

(10) Patent No.: US 7,370,977 B2
(45) Date of Patent: May 13, 2008

(54) OPTICAL PROJECTION SYSTEM AND IMAGE DISPLAY DEVICE HAVING THE SAME

(75) Inventor: Jong-soo Lee, Cheonan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 277 days.

(21) Appl. No.: 11/034,982

(22) Filed: Jan. 14, 2005

(65) Prior Publication Data

US 2005/0174545 A1   Aug. 11, 2005

(30) Foreign Application Priority Data

Feb. 9, 2004   (KR) .................... 10-2004-0008454

(51) Int. Cl.
*G03B 21/14* (2006.01)
*G03B 21/20* (2006.01)
*G03B 21/22* (2006.01)
*G02B 17/00* (2006.01)
*G02B 15/14* (2006.01)

(52) U.S. Cl. .................... 353/70; 353/77; 353/98; 353/102; 353/121; 359/364; 359/366; 359/692

(58) Field of Classification Search ............ 353/69, 353/70, 77–79, 98, 99, 102, 121; 359/362–366, 359/650, 692; 345/7
See application file for complete search history.

(56) References Cited

U.S. PATENT DOCUMENTS

| 5,726,670 | A  | * | 3/1998 | Tabata et al. ............... 345/7 |
| 6,354,707 | B1 | * | 3/2002 | Jeon et al. ............... 353/69 |
| 6,471,359 | B1 |   | 10/2002 | Kim et al. |
| 6,536,907 | B1 | * | 3/2003 | Towner et al. ............... 353/121 |
| 6,631,994 | B2 | * | 10/2003 | Suzuki et al. ............... 353/77 |
| 6,824,274 | B2 | * | 11/2004 | Suzuki et al. ............... 353/77 |
| 6,994,437 | B2 | * | 2/2006 | Suzuki et al. ............... 353/77 |
| 2003/0095238 | A1 | * | 5/2003 | Imafuku et al. ............... 353/69 |

FOREIGN PATENT DOCUMENTS

| JP | 2002-107618   | 4/2002 |
| KR | 2002-70600 A  | 9/2002 |

* cited by examiner

*Primary Examiner*—Melissa Jan Koval
(74) *Attorney, Agent, or Firm*—Stanzione & Kim, LLP

(57) ABSTRACT

An optical projection system which creates pincushion distortion of an image and then creates a barrel distortion of the pincushion-distorted image to compensate for the pincushion distortion and then projects an enlarged image without substantial distortion onto an image display surface. An embodiment includes a polynomial reflector to compensate for the pincushion distortion, to enlarge an image, and to project the enlarged image toward a screen.

25 Claims, 5 Drawing Sheets

OPTICAL PROJECTION SYSTEM AND IMAGE DISPLAY DEVICE HAVING THE SAME

CROSS-REFERENCE TO RELATED APPLICATIONS

This application claims the benefit of Korean Patent Application No. 2004-8454 filed on Feb. 9, 2004, in the Korean Intellectual Property Office, the disclosure of which is incorporated herein by reference in its entirety.

BACKGROUND OF THE INVENTION

1. Field of the Invention

The present general inventive concept relates to an image display device, such as a projection television. More particularly, the present general inventive concept relates to an optical projection system, which has a compact depth and an image display device having the same.

2. Description of the Related Art

An image display device, such as a projection television, generates an image using a micro display, and enlarges the image via an optical projection system to project the image onto a large-sized screen. Consumer demand for the image display device having the large-sized screen has recently increased.

Figure 1:
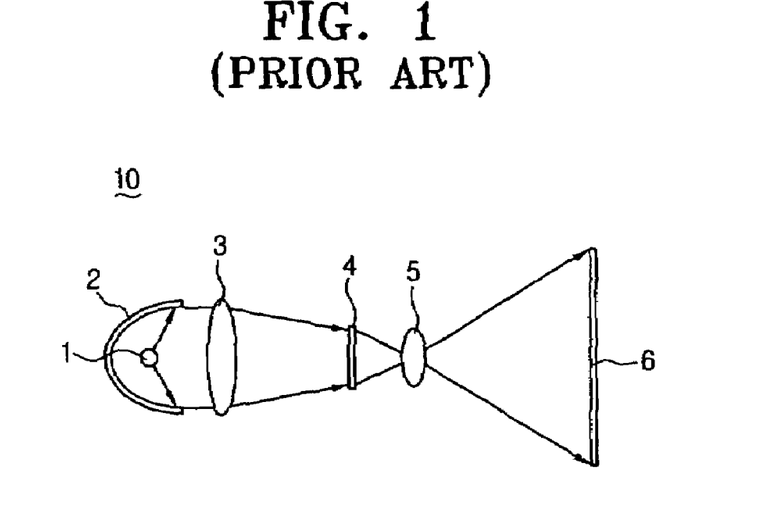
FIG. 1 illustrates a conventional projection television.

FIG. 1 illustrates a conventional projection television 10.

The projection television 10 comprises a lamp 1 for generating light beams, a parabolic reflector 2 for reflecting the light beams, a lighting lens 3 for compressing (i.e., condensing) the light beams, a light valve 4 for modulating light, shade, and space density of the compressed light beams according to electronic image signals and forming an image therefrom, a projecting optic lens 5 for enlarging and projecting the image, and a screen 6 for displaying the image.

The operation of the conventional projection television 10 will be briefly described with reference to FIG. 1. First, the light beams generated by the lamp 1 are reflected to the lighting lens 3 by the parabolic reflector 2, and the light beams are compressed and projected to the light valve 4.

The light valve 4 modulates the light beams radiated from the lighting lens 3 according to the electronic image signals to form the image, and the light valve 4 projects the image to the projecting optic lens 5.

The projecting optic lens 5 enlarges and projects the image onto the screen 6, and the screen 6 displays the enlarged image thereon.

In the conventional projection television 10 having the structure described above, a depth of the conventional projection television 10 depends on a distance between the parabolic reflector 2 and the screen 6. As such, a wide-angle projecting optical lens capable of projecting the image by a wide angle is used as the projecting optic lens 5 for minimizing the depth of the conventional projection television 10.

However, since the wide-angle projecting optical lens used to increase an angle of view has limitations, decreasing the depth of the conventional projection television 10 using the wide-angle projection optical lens also has limitations.

Figure 2:
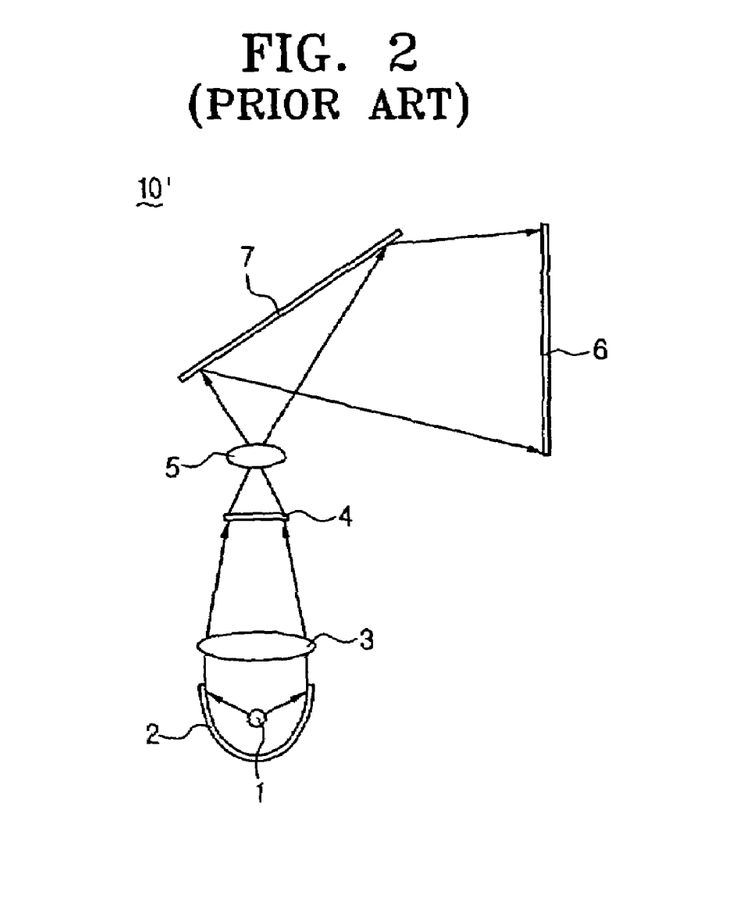
FIG. 2 illustrates another conventional projection television.

In an attempt to overcome the drawbacks described above, another projection television 10' illustrated in FIG. 2 has been used. The projection television 10' reflects an optical path of the projecting optic lens 5 to project the image onto the screen 6 from a vertical direction to a horizontal direction by arranging a flat reflecting mirror 7 between the projecting optic lens 5 and the screen 6 at about a 45 degree angle with respect to the vertical direction.

However, the projection television 10' arranges a lighting system comprising the lamp 1, the parabolic reflector 2, the lighting lens 3, and the projecting optic lens 5 perpendicular to the screen 6 such that the depth of the projection television 10' is reduced to a distance between the flat reflecting mirror 7 and the screen 6. As such, the depth decreases more than the conventional projection television 10, however, an image projected back by the flat reflecting mirror 7 may tend to interfere with the image formed by the light valve 4 and projected from the lighting system. As a result, the image gets grainy or dim.

To prevent the problems described above, a convex mirror may be used instead of the flat reflecting mirror 7 to prevent image interference. However, in this case, the image displayed on the screen 7 is distorted.

SUMMARY OF THE INVENTION

The present general inventive concept provides an optical projection system and an image display device having the same, which projects an image by a large angle of view onto a screen by vertically arranging the optical projection system and having a refraction part and a reflection part. Thus, a depth of the image display device is reduced, and light beams emitted from a lighting system and a micro display part do not interfere with the image projected onto the screen.

The present general inventive concept also provides an optical projection system and an image display device having the same, which is capable of compensating for distortion in an image using characteristics of an aspheric lens so that a large image of superior quality can be obtained.

The present general inventive concept also provides an optical projection system and an image display device having the same, which bends a path of light from a horizontal direction to a vertical direction such that a depth of the image display device is reduced and compact, thereby minimizing a size thereof.

Additional aspects and advantages of the present general inventive concept will be set forth in part in the description which follows and, in part, will be obvious from the description, or may be learned by practice of the general inventive concept.

The foregoing and/or other aspects and advantages of the present general inventive concept are achieved by providing an optical projection system to enlarge an image and to project the enlarged image, comprising a refraction part to create a pincushion distortion in an image, and a reflection part to create a barrel distortion in the pincushion-distorted image to compensate for the pincushion distortion and to project the barrel distorted image as an enlarged image without distortion onto an image display surface.

The refraction part may comprise a first cylinder symmetrical optic system having a first group of lenses including at least one aspheric lens, a second cylinder symmetrical optic system having a second group of lenses including at least one aspheric lens, and a second planar reflecting optic system to reflect the image that passes through the second cylinder symmetrical optic system to the reflection part.

The refraction part may further comprise a first planar reflecting optic system disposed adjacent to the first cylinder symmetrical optic system and the second cylinder symmetrical optic system to bend the image that passes through the first cylinder symmetrical optic system by a first predetermined angle.

The first and second planar reflecting optic systems may respectively comprise a first planar reflecting mirror disposed to bend the image that passes through the first cylinder symmetrical optic system from a horizontal direction to a vertical direction by a first predetermined angle, and a second planar reflecting mirror disposed to bend the image that passes through the second cylinder symmetrical optic system from a vertical direction to a horizontal direction by a second predetermined angle.

The reflection part may comprise a reflecting mirror having an XY polynomial surface and inclinedly disposed by a predetermined angle to inclinedly project the enlarged image.

The optical projection system may further comprise a third planar reflecting optic system to reflect the image projected from the reflection part onto the image display surface. The third planar reflecting optic system may comprise a third planar reflecting mirror disposed in parallel with the image display surface.

The foregoing and/or other aspects and advantages of the present general inventive concept are also achieved by providing an image display device comprising a lighting system to emit light beams, a micro display part to modulate the light beams emitted from the lighting system according to electronic image signals and to form a corresponding image, an optical projection system to enlarge the image formed by the micro display part and to project the enlarged image, and a screen to display the image projected by the optical projection system, wherein the optical projection system comprises a refraction part to create a pincushion distortion in the image formed by the micro display part and a reflection part to create a barrel distortion in the pincushion-distorted image to compensate for the pincushion distortion and to project the enlarged image without distortion onto the screen.

The refraction part may comprise a first cylinder symmetrical optic system having a first group of lenses including at least one aspheric lens, a second cylinder symmetrical optic system having a second group of lenses including at least one aspheric lens, and a second planar reflecting optic system to reflect the image that passes through the second cylinder symmetrical optic system to the reflection part.

The refraction part may further comprise a first planar reflecting optic system disposed between the first cylinder symmetrical optic system and the second cylinder symmetrical optic system to bend the image that passes through the first cylinder symmetrical optic system by a predetermined angle.

The first and second planar reflecting optic systems may respectively comprise a first planar reflecting optic mirror disposed to bend the image that passes through the first cylinder symmetrical optic system from a horizontal direction to a vertical direction by a first predetermined angle and a second planar reflecting mirror disposed to bend the image that passes through the second cylinder symmetrical optic system from a vertical direction to a horizontal direction by a second predetermined angle.

The reflection part may comprise a reflecting mirror having an XY polynomial surface and inclinedly disposed by a predetermined angle so as to inclinedly project the enlarged image.

The optical projection system may further comprise a third planar reflecting optic system to reflect the image projected from the reflection part onto the screen.

The third planar reflecting optic system may comprise a third planar reflecting mirror disposed in parallel with the screen.

BRIEF DESCRIPTION OF THE DRAWINGS

The above and other aspects, features and advantages of the present general inventive concept will be more apparent from the following detailed description taken with reference to the accompanying drawings, in which: These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
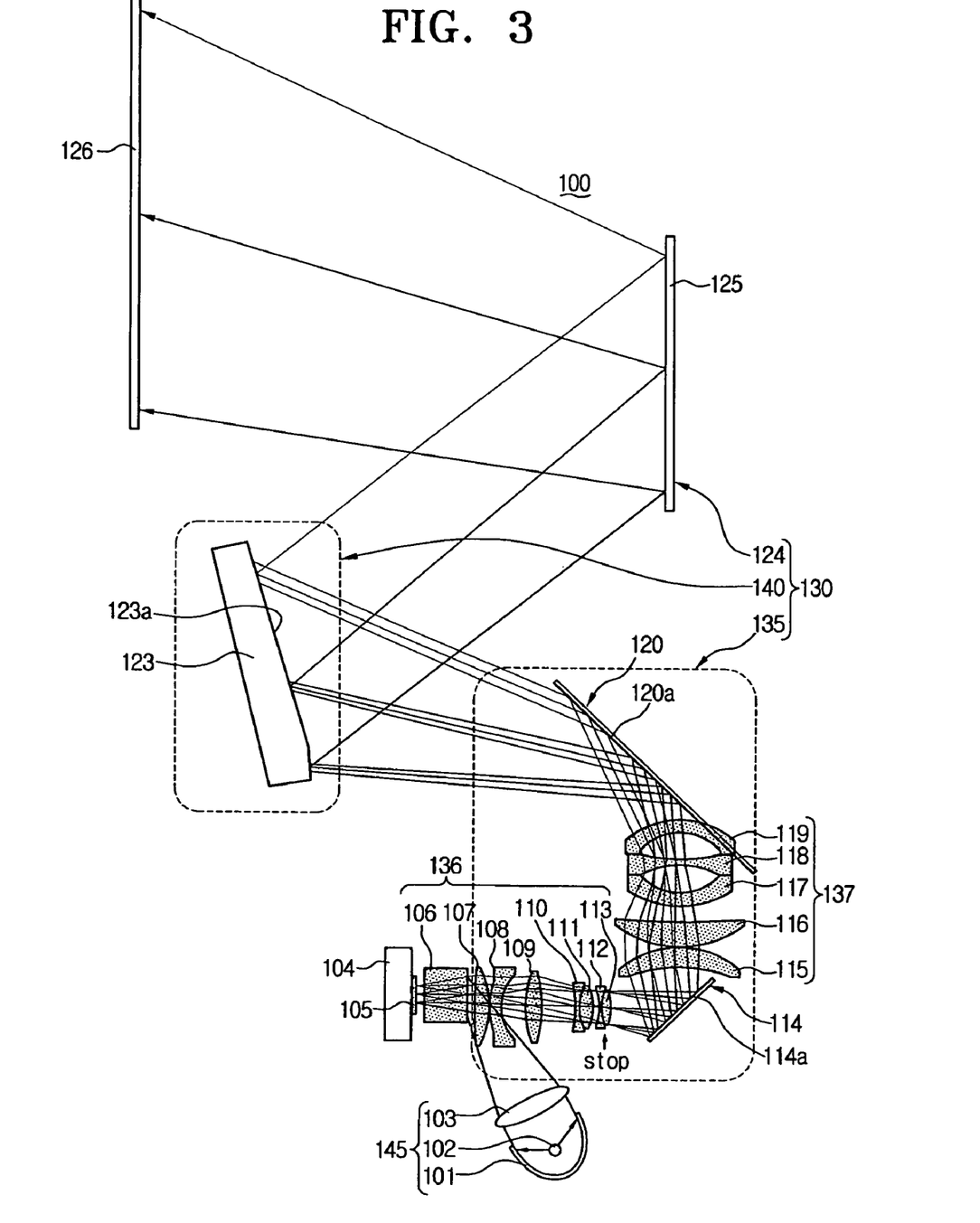
FIG. 3 illustrates an image display device including an optical projection system according to an embodiment of the present general inventive concept.

FIG. 3 illustrates an image display device 100 (e.g., a projection television) including an optical projection system according to an embodiment of the present general inventive concept.

The image display device 100 comprises a lighting system 145 to radiate light beams, a micro display part 104 to modulate the light beams according to an electric image signal to generate an image therefrom and to project the image, an optical projection system 130 to enlarge the projected image and to form an enlarged image (c) without distortion (see FIG. 4C) and to project the enlarged image (c) onto a screen 126, and the screen 126 to display the projected image.

The lighting system 145 comprises a lamp 102 to generate the light beams, a parabolic reflector 101 to reflect the light beams, and a lighting lens 103 to condense the reflected light beams and to project the light beams to the micro display part 104.

The micro display part 104 may include a spatial light modulator.

A cover glass 105 and a total reflection prism 106 are disposed in a back direction (i.e., a right side of FIG. 3) of the micro display part 104. The cover glass 105 protects the micro display part 104. The total reflection prism 106 projects the light beams received from the lighting lens 103 to the micro display part 104, and projects the light beams of the image projected from the micro display part 104 to a refraction part 135 of an optical projection system 130.

The optical projection system 130 comprises the refraction part 135 to create a pincushion distortion in the image (i.e., the light beams of the image) projected from the micro display part 104, and a reflection part 140 to compensate for the pincushion distortion by creating a barrel distortion in the pincushion-distorted image received from the refraction part 135.

The refraction part 135 comprises a first cylinder symmetrical optic system 136 that is horizontally arranged, a second cylinder symmetrical optic system 137 perpendicular to the first cylinder symmetrical optic system 136 (i.e., vertically arranged), and a first planar reflecting optic system 114 disposed between the first cylinder symmetrical optic system 136 and the second cylinder symmetrical optic system 137 to reflect an image that passes through the first cylinder symmetrical optic system 136 to the second cylinder symmetric optic system 137. The refraction part 135 further comprises a second planar reflecting optic system 120 disposed on a top portion of the second cylinder symmetrical optic system 137 to reflect an image that passes through the second cylinder symmetrical optic system 137 to the reflection part 140.

The first cylinder symmetrical optic system 136 comprises first, second, third, fourth, fifth, and sixth lenses 107, 108, 109, 110, 111, and 112, respectively, to converge the light beams of the image that pass through the total reflection prism 106, and a seventh lens 113 to diverge the light beams of the image that pass through the sixth lens 112.

The first, third, fifth, and seventh lenses 107, 109, 111, and 113 may be circle type lenses having a positive (+) power, and the second, fourth, and sixth lenses 108, 110, and 112 may be circle type lenses having a negative (−) power.

Both sides of the second lens 108 may be aspheric to compensate for image distortion.

The second cylinder symmetrical optic system 137 comprises eighth, ninth, and tenth lenses 115, 116, and 117 to converge the light beams of the image reflected by a first planar mirror 114a of the first planar reflection optic system 114, which will be describe below, and eleventh and twelfth lenses 118 and 119 to diverge the light beams of the image that pass through the tenth lens 117.

The eighth and ninth lenses 115 and 116 are circle type lenses having a positive (+) power, and the tenth, eleventh, and twelfth lenses 117, 118, and 119 are circle type lenses having a negative (−) power.

Both sides of the tenth lens 117 may be aspheric to compensate for image distortion. Thus, even though the first and second cylinder symmetrical optic systems 136 and 137 introduce a desired pincushion distortion to the image that passes therethrough, the second lens 108 and the tenth lens 117, which have aspheric sides, can compensate for any unwanted image distortion.

The first planar reflecting optic system 114 includes the first planar reflecting mirror 114a disposed between the seventh lens 113 and the eighth lens 115 with a reflecting surface angled upward at a predetermined angle (e.g., 45 degrees) such that the light beams of the image that diverge from the seventh lens 113 of the first cylinder symmetrical optic system 136 are bent from a horizontal direction to a vertical direction and are reflected to the eighth lens 115 of the second cylinder symmetrical optic system 137.

The first planar reflecting optic system 114 bends the light beams of the image that horizontally pass through the first cylinder symmetrical optic system 136 at a certain angle to the second cylinder symmetrical optic system 137. For example, the first planar reflecting optic system 114 may bend the light beams of the image vertically to the second cylinder symmetrical optic system 137. Bending the light beams of the image enable a size of the optical projection system 130 to be made more compact than if the first and second cylinder symmetrical optic systems 136 and 137 are both vertically or both horizontally arranged. This decrease in size of the optical projection system 130 thereby reduces a depth and/or a height of the image display device 100.

The second planar reflecting optic system 120 includes a second planar reflecting mirror 120a arranged at a top portion of the twelfth lens 119 of the second cylinder symmetrical system 137 with a reflecting surface angled downward by a predetermined angle (e.g., 45 degrees) such that the light beams of the image that pass through the second cylinder symmetrical optic system 137 are bent from a vertical direction to a horizontal direction by a certain angle. For example, the certain angle may be more than a 90 degree angle, and the light beams of the image may be reflected to the reflection part 140.

Figure 4A:
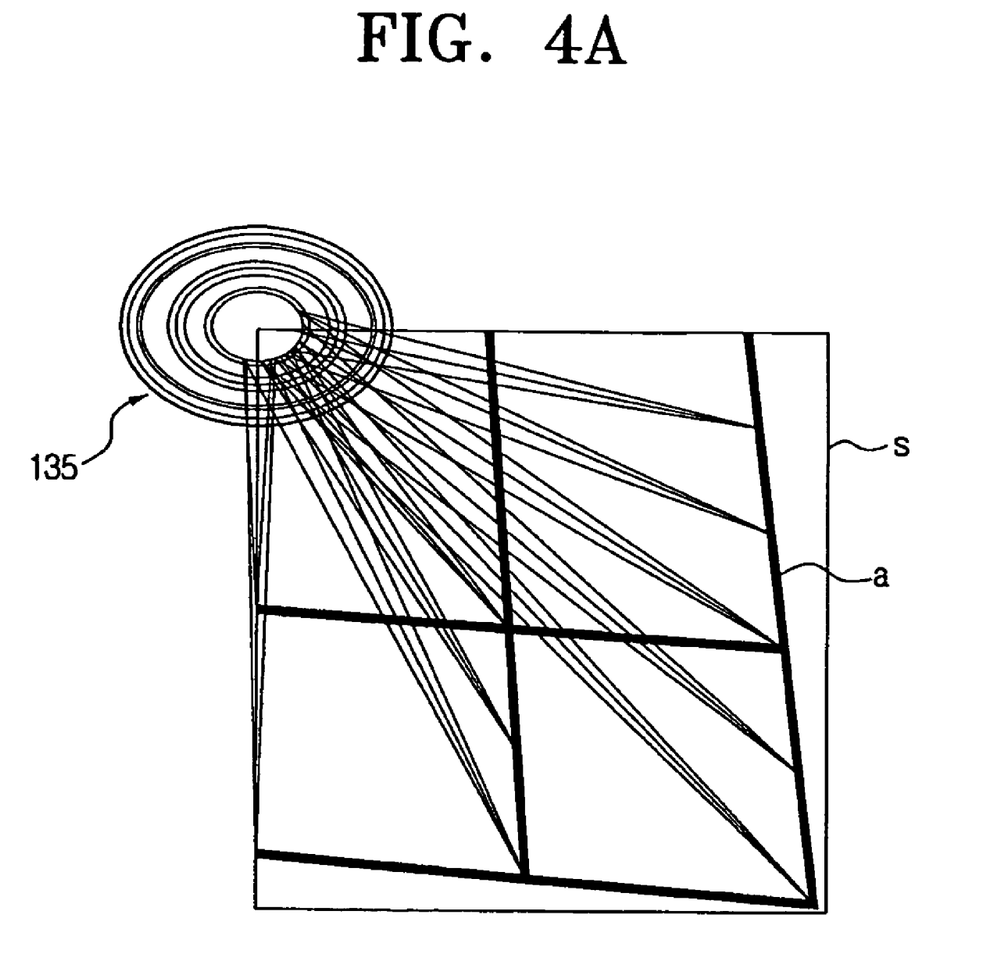
FIGS. 4A, 4B, and 4C are image views to illustrate an image status generated by a refraction part and a reflection part of the optical projection system of FIG. 3.

The refraction part 135 converges, diverges, reflects, converges, diverges, and reflects the light beams projected from the micro display part 104 and that pass through the total reflecting prism 106 to the first and second cylinder symmetrical optic systems 136 and 137 and the first and second planar reflecting optic systems 114 and 120. The light beams of the image incur a pincushion distortion such that the image that passes through the refraction part 135 becomes a pincushion distortion image (a) reduced from a standard quadrangular pyramid (s), as illustrated in FIG. 4A.

The reflection part 140 creates a barrel distortion to compensate for the pincushion distortion of the image (a) and is disposed under the screen 126 at a front side (i.e., a left side in FIG. 3) of the image display device 100. The reflection part 140 comprises a reflecting mirror 123 of a negative (−) power having an XY polynomial surface 123a that may diverge the light beams of the image. The XY polynomial surface 123a will be described in detail in Table 1.

Figure 4B:
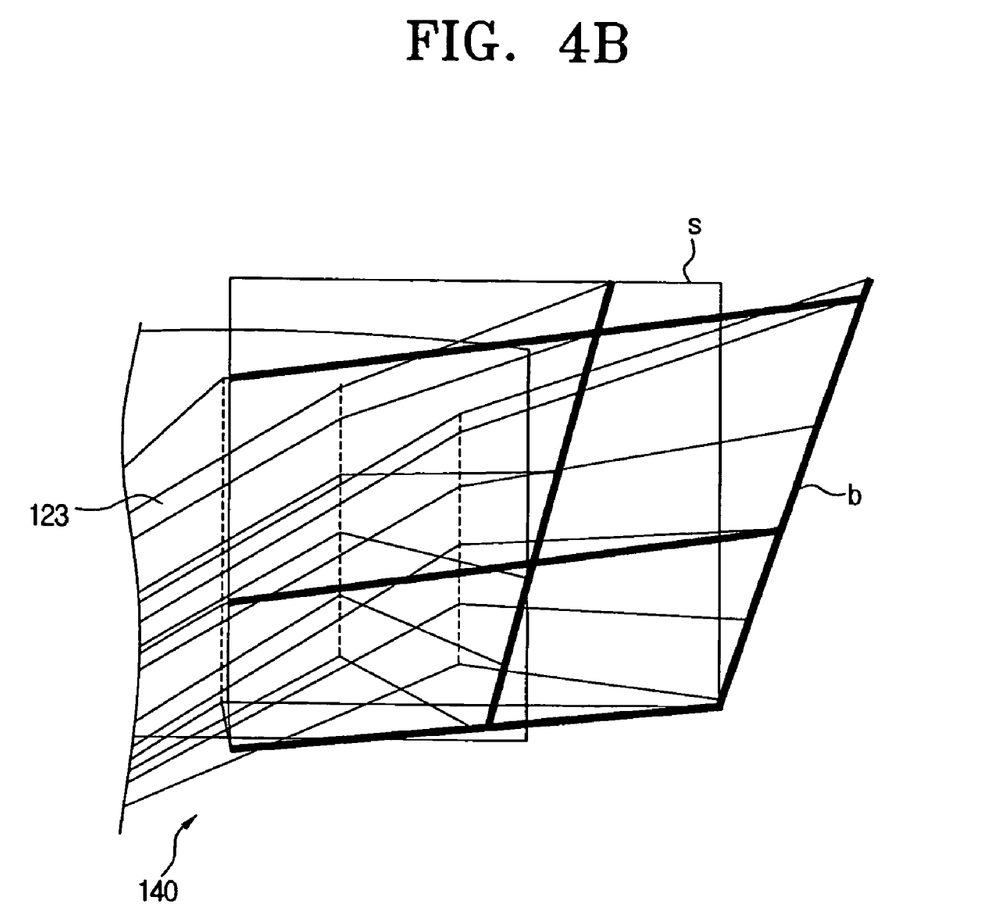
Figure 4C:
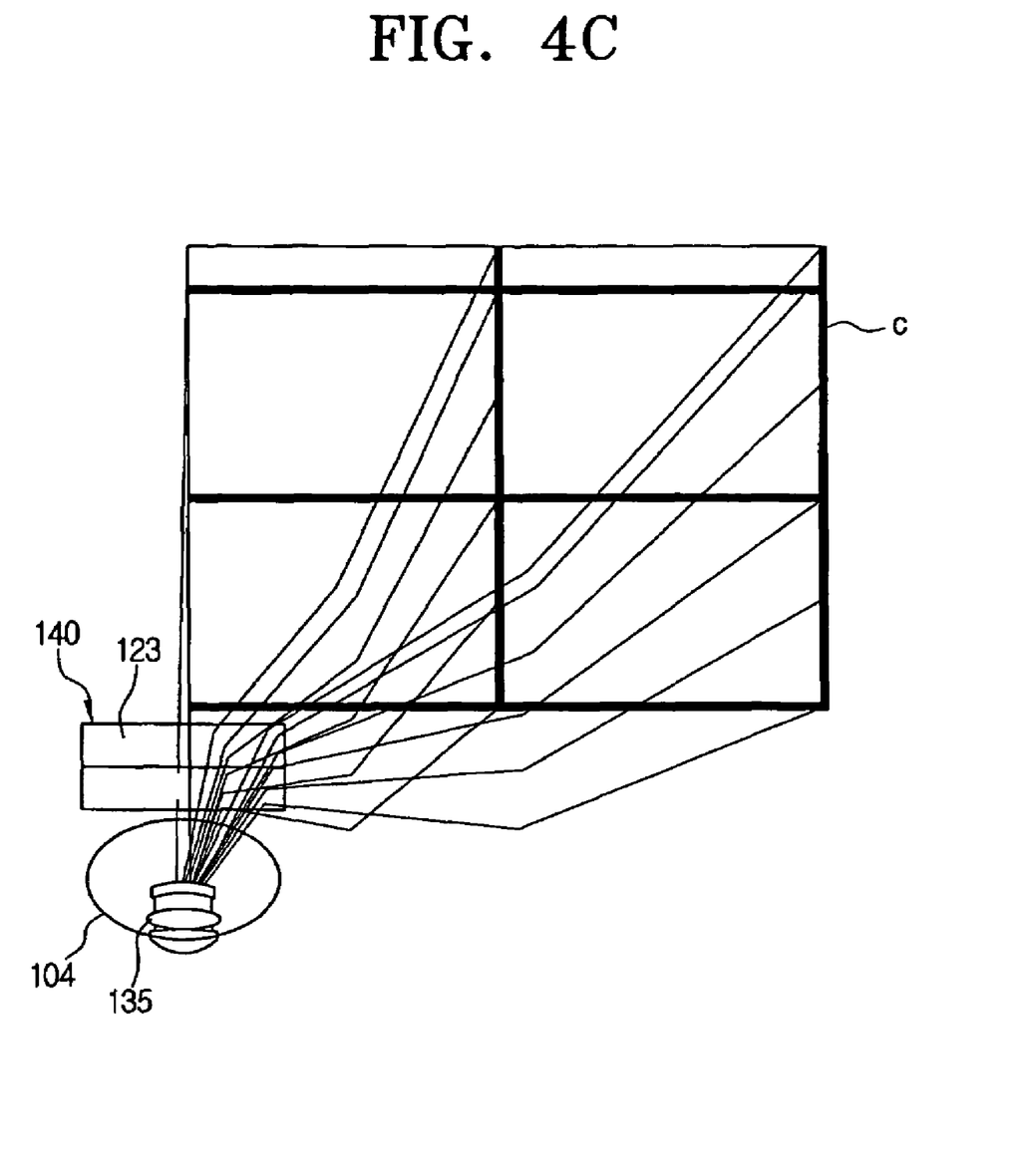

The reflecting mirror 123 compensates for the pincushion distortion of the image (a) received from the refraction part 135 by creating a barrel distortion in the image to provide a barrel distortion image (b) expanded from the standard quadrangular pyramid (s) (see FIG. 4B) such that an enlarged image (c) without distortion is formed (see FIG. 4C). The reflecting mirror 123 inclinedly projects the enlarged image (c) to a third planar reflecting mirror 125 of a third planar reflecting optic system 124 such that the third planar reflecting mirror 125 can project the image by a large angle of view onto the screen 126.

The optical projection system 130 further comprises the third planar reflecting optic system 124 to receive the enlarged image (c) projected from the XY polynomial surface 123a of the reflecting mirror 123 and to reflect the enlarged image (c) onto the screen 126.

The third planar reflecting optic system 124 includes a third planar reflecting mirror 125 arranged parallel to the screen 126 at a rear side (i.e., the right side in FIG. 3) of the image display device 100.

The third planar reflecting mirror 125 projects the enlarged image (c) onto the screen 126 at the large angle of view that corresponds to an incident angle of the enlarged image (c), because the reflecting mirror 123 of the reflection part 140 inclinedly projects the enlarged image (c) onto the third reflecting mirror 125.

The screen 126 is a surface to display the image reflected from the third planar reflecting optic system 124. The screen 126 may include a Fresnel lens.

The image display device 100 having the structure described above may satisfy the following conditions indicated in Table 1, which follows.

TABLE 1

| REFERENCE NO. | SURFACE NO. | CURVATURE | THICKNESS(mm) | REFRACTIVE INDEX | DISPERSION |
|---|---|---|---|---|---|
| | OBJ | INFINITY | 0.787400 | | |
| 105 | 1 | INFINITY | 2.743200 | 1.487490 | 70.4058 |
| | 2 | INFINITY | 4.800000 | | |
| 106 | 3 | INFINITY | 25.000000 | 1.487490 | 70.4058 |
| | 4 | INFINITY | 4.700000 | | |
| 107 | 5 | 600.00000 | 7.500000 | 1.755201 | 27.5795 |
| | XDE: 0.000000 YDE: −6.940447 ZDE: 0.000000 | | | | |
| | ADE: 0.000000 BDE: 0.000000 CDE: 0.000000 | | | | |
| | 6 | −56.70604 | 0.100000 | | |
| 108 | 7(ASPHERIC SURFACE) | 30.00000 | 6.500000 | 1.487490 | 70.4058 |
| | K: −0.242345 | | | | |
| | A: 0.402107E−04  B: 0.413435E−07  C: −0.321130E−10  D: 0.103909E−13 | | | | |
| | 8(ASPHERIC SURFACE) | 26.60806 | 14.294297 | | |
| | K: −1.47764 | | | | |
| | A: −0.79568E−04  B: 0.80708E−07  C: −0.26743E−10  D: 0.14784E−13 | | | | |
| 109 | 9 | 64.27519 | 9.000000 | 1.755201 | 27.5795 |
| | 10 | −93.87302 | 10.5703 | | |
| 110 | 11 | −128.92852 | 3.000000 | 1.680646 | 31.3877 |
| | 12 | 33.84218 | 7.000000 | 1.567155 | 63.4528 |
| 111 | 13 | −33.84218 | 3.000000 | | |
| | 14 | −37.79612 | 2.000000 | 1.755201 | 27.5795 |
| 112 | 15 | 31.16050 | 5.000000 | 1.623856 | 59.6394 |
| | 16 | −65.08097 | 0.100000 | | |
| 113 | 17(Stop) | INFINITY | 35.450306 | | |
| | 18 | INFINITY | 0.000000 | | |
| 114 | 19(REFLECTING SURFACE) | INFINITY | −25.000000 | | |
| | XDE: 0.000000 YDE: 0.000000 ZDE: 0.000000 | | | | |
| | ADE: −60.000000 BDE: 0.000000 CDE: 0.000000 | | | | |
| 115 | 20 | 368.66396 | −13.000000 | 1.806099 | 33.2694 |
| | 21 | 71.03657 | −1.486489 | | |
| 116 | 22 | −76.34953 | −13.000000 | 1.806099 | 33.2694 |
| | 23 | −1989.88932 | −1.813932 | | |
| 117 | 24(ASPHERIC SURFACE) | −32.20587 | −10.000000 | 1.492000 | 57.1000 |
| | K: −0.23473 | | | | |
| | A: 0.676420E−05  B: 0.361183E−08  C: −0.337643E−11  D: 0.198290E−14 | | | | |
| | 25(ASPHERIC SURFACE) | −19.01512 | −19.625704 | | |
| | K: −0.876506 | | | | |
| | A: 0.472109E−05  B: 0.686717E−08  C: −0.109259E−10  D: 0.603628E−14 | | | | |
| 118 | 26 | 40.82242 | −3.000000 | 1.670028 | 47.1965 |
| | 27 | −183.73052 | −12.410275 | | |
| 119 | 28 | 33.34566 | −8.000000 | 1.589129 | 61.2526 |
| | 29 | 50.00000 | −18.000000 | | |
| 120 | 30 | INFINITY | 0.000000 | | |
| | 31(REFLECTING SURFACE) | INFINITY | 260.000000 | | |
| | XDE: 0.000000 YDE: 0.000000 ZDE: 0.000000 | | | | |
| | ADE: −28.000000 BDE: 0.000000 CDE: 0.000000 | | | | |
| 123 | 32(XY POLYNOMIAL SURFACE) | 252.36888 | −265.000000 | | |
| | K: −1.8514E+01  X: 2.1116E−05  Y: −1.6624E−01 | | | | |
| | X2: 9.2825E−04  Y2: 8.6304E−04  X2Y: −3.4713E−06 | | | | |
| | Y3: 3.6732E−07  X4: −2.4527E−08  X2Y2: −1.2594E−08 | | | | |
| | Y4: −8.2269E−08  X4Y: 1.7029E−10  X2Y3: −9.3669E−11 | | | | |
| | Y5: 9.8995E−10  X6: 6.0708E−13  X4Y2: 2.1187E−14 | | | | |
| | X2Y4: 2.7510E−12  Y6: −6.6078E−12  X6Y: −3.6415E−15 | | | | |
| | X4Y3: −4.2999E−15  X2Y5: −1.5790E−14  Y7: 2.4125E−14 | | | | |
| | X8: −9.1782E−18  X6Y2: 1.2157E−17  X4Y4: 1.1379E−17 | | | | |
| | X2Y6: 2.9876E−17  Y8: −3.6858E−17 | | | | |
| | XDE: 0.000000 YDE: −1.011079 ZDE: 0.000000 | | | | |
| | ADE: 10.098297 BDE: 0.000000 CDE: 180.000000 | | | | |
| 125 | 33(REFLECTING SURFACE) | INFINITY | 330.000000 | | |
| | XDE: 0.000000 YDE: 0.000000 ZDE: 0.000000 | | | | |
| | ADE: 0.000000 BDE: 0.000000 CDE: 180.000000 | | | | |
| 126 | 34(IMAGINARY SCREEN SURFACE) | INFINITY | 0.000000 | | |
| | XDE: 0.000000 YDE: 0.000000 ZDE: 0.000000 | | | | |
| | ADE: 0.000000 BDE: 0.000000 CDE: 0.000000 | | | | |
| | Image | | 0.000000 | | |

XDE: X axis parallel movement value, YDE: Y axis parallel movement value, ZDE: Y axis parallel movement value;
ADE: X axis rotation value, BDE: Y axis rotation value, CDE: X axis rotation value;
K: Conic constant, A: aspheric fourth order coefficient, B: aspheric sixth order coefficient, C: aspheric eighth order coefficient, D: aspheric tenth order coefficient;
X, X2, X4, X6 and X8: coordinate X first order, second order, fourth order and sixth order constant;
Y, Y2, Y3, Y4, Y5, Y6, Y7 and Y8: coordinate Y first order, second order, third order, fourth order fifth order, sixth order, seventh order and eight order constant;
X2Y, X2Y2, X2Y3, X2Y4, X2Y5, X2Y6, X4Y, X4Y2, X4Y second order Y second order, X second order Y third order, X second order Y forth order, X second order Y fifth order, X second order Y sixth order, X fourth order Y first order, X forth order Y second order, X fourth order Y third order, X fourth order Y fourth order, X sixth order Y first order and X sixth order Y second order constant.

Apertures of the lenses 107, 108, 109, 110, 111, 112, 113, 115, 116, 117, 118, and 119 used in the refraction part 135 of the optical projection system 130 of the image display device 100 and an aperture of the reflecting mirror 123 of the reflection part 140 may satisfy the following conditions indicated in Table 2.

TABLE 2

| Section | | | | The whole |
|---|---|---|---|---|
| Reference No. | Surface No. | Form | Effective aperture | aperture to edge (mm) |
| 107 | 5 | circle | 21.600000 | 24.000000 |
|  | 6 | circle | 21.900000 |  |
| 108 | 7 | circle | 20.700000 | 24.000000 |
|  | 8 | circle | 20.000000 |  |
| 109 | 9 | circle | 21.000000 | 22.000000 |
|  | 10 | circle | 20.700000 |  |
| 110 | 11 | circle | 13.000000 | 15.000000 |
|  | 12 | circle | 12.300000 | 13.500000 |
| 111 | 13 | circle | 12.000000 |  |
|  | 14 | circle | 10.500000 | 13.000000 |
| 112 | 15 | circle | 10.200000 | 11.500000 |
|  | 16 | circle | 10.10000 |  |
| 113 | 17(Stop) | circle | 9.920000 |  |
| 115 | 20 | circle | 33.100000 | 36.000000 |
|  | 21 | circle | 34.450000 |  |
| 116 | 22 | circle | 34.400000 | 36.000000 |
|  | 23 | circle | 33.300000 |  |
| 117 | 24 | circle | 28.600000 | 33.000000 |
|  | 25 | circle | 22.800000 |  |
| 118 | 26 | circle | 22.800000 | 30.000000 |
|  | 27 | circle | 24.455000 |  |
| 119 | 28 | circle | 24.455000 | 32.000000 |
|  | 29 | circle | 29.700000 |  |
| 123 | 32 | Square X direction | 122.000000 | 124.000000 |
|  | 32 | Square Y direction | 77.000000 | 79.000000 |
|  | 32 | Y axis parallel movement | 97.000000 | 97.000000 |

As described above, the image display device 100 according to an embodiment of the present general inventive concept vertically arranges the refraction part 135 and the reflection part 140 of the optical projection system 130. The reflection part 140 inclinedly projects the image from the refraction part 135 onto the third planar reflecting mirror 125 such that the depth of the image display device 100 can be reduced. When a large-sized image is displayed on the screen 126, the image is not interfered with by light beams generated by the lighting system 145 such as the lamp 102 and the micro display part 104. Furthermore, the image display device 100 compensates for an image distortion produced when the image passes through the refraction part 135, because the second lens 108 and the tenth lens 117 include aspheric lenses, and the reflection part 140 includes the reflecting mirror 123 having the XY polynomial surface 123a. As a result, a large high quality image can be formed on the screen 126.

Operation of the image display device 100 having the structure described above will now be described with reference to FIG. 3.

First, light beams generated by the lamp 102 are reflected to the lighting lens 103 by the parabolic reflector 101. The lighting lens 103 converges the light beams, and the light beams enter the micro display part 104 via the total reflecting prism 106 and the cover glass 105.

The micro display part 104 modulates the light beams received from the lighting lens 103 according to electronic image signals and generates an image therefrom. The micro display part 104 then projects the image (i.e., the light beams of the image) via the cover glass 105 and the total reflecting prism 106 to the first cylinder symmetrical optic system 136 of the refraction part 135.

The first cylinder symmetrical optic system 136 converges the light beams of the image that pass through the total reflecting prism 106 via the first, second, third, fourth, fifth, and sixth lenses 107, 108, 109, 110, 111, and 112, and diverges the light beams of the image via the seventh lens 113 towards the first planar reflecting mirror 114a of the first planar reflecting optic system 114.

The first planar reflecting mirror 114a vertically bends the light beams of the image diverged by the seventh lens 113 by a first predetermined angle. For example, the first planar reflecting mirror may reflect the light beams of the image by less than a 90 degree angle from the seventh lens 113 of the first cylinder symmetrical optic system 136 to the eighth lens 115 of the second cylinder symmetrical optic system 137.

The light beams of the image reflected to the eighth lens 115 are converged by the eighth, ninth, and tenth lenses 115, 116, and 117, and diverged by the eleventh and twelfth lenses 118 and 119.

The light beams of the image diverged by the eleventh and twelfth lenses 118 and 119 are directed toward the second planar reflecting mirror 120a of the second planar reflecting system 120 in the shape of the pincushion-distorted image (a) (see FIG. 4A) created by the first and second cylinder symmetrical optic system 136 and 137 that includes the aspheric second lens 108 and tenth lens 117, respectively.

The second planar reflecting mirror 120a horizontally bends the pincushion distorted image (a) by a predetermined angle (e.g., an angle more than 90 degrees), and reflects the pincushion distorted image (a) received via the twelfth lens 119 to the reflection part 140.

The reflection part 140 creates a barrel distortion and compensates for the pincushion-distorted image (a) reflected from the second planar reflecting mirror 120a to form a barrel distortion image (b) (see FIG. 4B) using the XY polynomial surface 123a of the reflecting mirror 123. The reflection part 140 inclinedly projects the barrel distortion image (b) by a predetermined angle (e.g., an angle less than 90 degrees) onto the third planar reflecting mirror 125 of the third planar reflecting optic system 124 to form the enlarged image (c) without distortion, as illustrated in FIG. 4C.

As the XY polynomial surface 123a of the reflection part 140 inclinedly projects the enlarged image (c), the third planar reflecting mirror 125 projects the enlarged image (c)

onto the screen 126 according to the incident angle thereof such that the enlarged image (c) is projected onto the screen 126 by a greater angle to create a large angle of view.

The optical projection system 130 and the image display device 100 having the same according to an embodiment of the present general inventive concept vertically arranges the optical projection system 130 having the refraction part 135 and the reflection part 140 such that an image is projected by a large angle of view onto the screen 126 within the image display device 100 having a compact depth. Additionally, the image is not interfered with by light beams emitted from the lighting system 145 and the micro display part 104.

The optical projection system 130 and the image display device 100 having the same compensate for distortion of the image using characteristics of an aspheric lens such that a large high quality image can be obtained.

The optical projection system 130 and image display device 100 having the same can bend a path of light from a horizontal direction to a vertical direction to minimize a depth and a height of the image display device 100.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An optical projection system to enlarge an image in an image display device, the optical projection system comprising:
   a series of lenses and reflectors to refract light beams of an image by converging and diverging the light beams of the image and by bending the light beams of the image, respectively, wherein the series of lenses and reflectors distorts the image to have a pin cushion-like shape distortion; and
   a polynomial reflector to receive the image from the series of lenses and reflectors, to compensate for the pin cushion-like shape distortion introduced by the series of lenses and reflectors by creating a barrel-like shape distortion of the image, to enlarge the image, and to project the enlarged image toward a screen.

2. The optical projection system according to claim 1, wherein the series of lenses and reflectors includes at least one aspheric lens that prevents unwanted image distortion from being introduced to the light beams of the image.

3. The optical projection system according to claim 1, wherein the series of lenses and reflectors comprises:
   a first one or more lenses to converge the light beams of the image;
   a second one or more lenses to diverge the light beams received from the first one or more lenses;
   a first reflector to reflect the light beams of the image received from the second one or more lenses from a first direction to a second direction substantially perpendicular to the first direction;
   a third one or more lenses to converge the light beams of the image received from the first reflector;
   a fourth one or more lenses to diverge the light beams of the image received from the third one or more lenses; and
   a second reflector to reflect the light beams of the image received from the fourth one or more lenses to the reflection part in a third direction opposite to the first direction.

4. The optical projection system according to claim 3, wherein the first and third one or more lenses each include at least one positive power lens and the second and the fourth one or more lenses each include at least one negative power lens.

5. An optical projection system to enlarge an image in an image display device, the optical projection system comprising:
   a refraction part to introduce a pin cushion-like shape distortion to an image received from a lighting system; and
   a reflection part to receive the image from the refraction part and to introduce a barrel-like shape distortion to the image that compensates for the pin cushion-like shape distortion while expanding the image.

6. The optical projection system according to claim 5, wherein both distortions are desired distortions.

7. The optical projection system according to claim 5, wherein the refraction part comprises at least a first group of lenses to converge and then diverge light beams of the image.

8. The optical projection system according to claim 7, wherein the at the least first group of lenses includes at least one lens of positive power, at least one lens of negative power, and at least one aspheric lens.

9. The optical projection system according to claim 5, wherein the at least the first group of lenses further includes a second group of lenses perpendicular to the first group of lenses.

10. The optical projection system according to claim 9, wherein the refraction part further comprises
   a first reflector to reflect the light beams of the image received from the first group of lenses to the second group of lenses, and
   a second reflector to reflect the light beams of the image received from the second group of lenses to the reflection part.

11. The optical projection system according to claim 10, wherein the first group of lenses passes the light beams of the image horizontally from a front side of the image display device to a rear side of the image display device, the first reflector reflects the light beams of the image received from the first group of lenses vertically to the second group of lenses at a first predetermined angle, the second group of lenses passes the light beams of the image vertically from a bottom side of the image display device to a top side of the image display device, the second reflector reflects the light beams of the image received from the second group of lenses to the reflection part at the front side of the image display device, and the reflection part reflects the light beams of the image toward a screen of the image display device.

12. An image display device, comprising:
   a lighting system to provide light beams;
   a micro display part to modulate the light beams provided by the lighting system to create an image;
   a series of lenses and reflectors to introduce a fist pin cushion-like shape distortion by, respectively, refracting and bending the light beams of the image received from the micro display part;
   a polynomial reflector to receive the light beams of the image from the series of lenses and reflectors and to introduce a barrel-like shape distortion that compensates for the pin cushion-like shape distortion while expanding the image; and
   a screen to receive the expanded image substantially without distortion.

13. The image display device according to claim 12, further comprising:
a third planar reflector disposed parallel to the screen to reflect the expanded image from the polynomial reflector to the screen at a wide angle of view.

14. The image display device according to claim 13, wherein the wide angle of view corresponds to an angle at which the expanded image is incident on the third planar reflector.

15. The image display device according to claim 12, wherein the series of lenses and reflectors includes at least one aspheric lens that prevents a further distortion from being introduced to the light beams of the image.

16. A method of projecting an image onto a screen in an image display device with an optical projection system, the method comprising:
receiving an image from an image forming part;
creating pincushion distortion in the image in a refraction part; and
expanding the image while compensating for the pincushion distortion by creating a barrel distortion in the pincushion distorted image and projecting the expanded image toward the screen with a reflection part.

17. The method according to claim 16, further comprising:
generating light beams with a lighting system;
modulating the light beams to form the image with a micro display part; and directing the light beams of the image to the optical projection system.

18. The method according to claim 16, wherein creating the pincushion distortion in the image in the refraction part comprises alternately converging, diverging, and reflecting, light beams of the image with lenses of positive power, lenses of negative power, and reflectors respectively.

19. The method according to claim 16, wherein creating the pincushion distortion in the image in the refraction part further comprises passing the light beams of the image through a horizontal group of lenses, reflecting the light beams of the image from the horizontal group of lenses to a vertical group of lenses, and reflecting the light beams of the image from the vertical group of lenses to the reflection part.

20. The method according to claim 16, wherein creating the pincushion distortion in the image in the refraction part further comprises compensating for unwanted distortion with an aspheric lens.

21. The method according to claim 16, wherein the reflection part is a polynomial surface.

22. The method according to claim 16, further comprising:
receiving the expanded image from the reflection part and reflecting the expanded image onto the screen using a third reflector parallel to the screen.

23. An optical projection system to enlarge an image in an image display device, the optical projection system comprising:
a series of lenses and reflectors to refract light beams of an image by converging and diverging the light beams of the image and by bending the light beams of the image, respectively; and
a polynomial reflector to receive the image from the series of lenses and reflectors, to compensate for distortion introduced by the series of lenses and reflectors, to enlarge the image, and to project the enlarged image toward a screen,
wherein the series of lenses and reflectors comprises:
a first one or more lenses to converge the light beams of the image;
a second one or more lenses to diverge the light beams received from the first one or more lenses;
a first reflector to reflect the light beams of the image received from the second one or more lenses from a first direction to a second direction substantially perpendicular to the first direction;
a third one or more lenses to converge the light beams of the image received from the first reflector;
a fourth one or more lenses to diverge the light beams of the image received from the third one or more lenses; and
a second reflector to reflect the light beams of the image received from the fourth one or more lenses to the reflection part in a third direction opposite to the first direction.

24. The optical projection system according to claim 23, wherein the first and third one or more lenses each include at least one positive power lens and the second and the fourth one or more lenses each include at least one negative power lens.

25. An optical projection system to enlarge an image in an image display device, the optical projection system comprising:
a series of lenses and reflectors to refract light beams of an image by converging and diverging the light beams of the image and by bending the light beams of the image, respectively; and
a polynomial reflector to receive the image from the series of lenses and reflectors, to compensate for distortion introduced by the series of lenses and reflectors, to enlarge the image, and to project the enlarged image toward a screen,
wherein the series of lenses comprises:
a first group of lenses and a second group of lenses perpendicular to the first group of lenses.

* * * * *